United States Patent
Frank et al.

(10) Patent No.: US 8,619,728 B2
(45) Date of Patent: Dec. 31, 2013

(54) METHOD AND SYSTEM FOR PROVIDING AN INTELLIGENT SWITCH FOR BANDWIDTH MANAGEMENT IN A HYBRID WIRED/WIRELESS LOCAL AREA NETWORK

(75) Inventors: Ed H. Frank, Atherton, CA (US); Richard Martin, Morgan Hill, CA (US)

(73) Assignee: Broadcom Corporation, Irvine, CA (US)

( * ) Notice: Subject to any disclaimer, the term of this patent is extended or adjusted under 35 U.S.C. 154(b) by 2314 days.

(21) Appl. No.: 10/658,725

(22) Filed: Sep. 9, 2003

(65) Prior Publication Data

US 2004/0052248 A1 Mar. 18, 2004

Related U.S. Application Data

(60) Provisional application No. 60/433,117, filed on Dec. 13, 2002, provisional application No. 60/411,261, filed on Sep. 17, 2002, provisional application No. 60/411,301, filed on Sep. 17, 2002, provisional application No. 60/435,984, filed on Dec. 20, 2002.

(51) Int. Cl.
- *H04W 4/00* (2009.01)
- *H04W 72/00* (2009.01)
- *H04L 12/66* (2006.01)
- *H04B 7/00* (2006.01)

(52) U.S. Cl.
USPC ........... 370/338; 370/328; 370/329; 370/341; 370/352; 455/450; 455/453; 455/509

(58) Field of Classification Search
USPC .............. 455/452.2, 436, 439, 450–451, 453, 455/455, 509, 550.1, 552.1, 556.2, 455/560–561; 370/338, 310, 231, 235–236, 370/252, 328–329, 332, 341, 346, 348, 352, 370/360, 386, 395.2–395.21, 395.41, 370/395.52–395.53, 396, 398, 422, 445, 370/447, 461–462

See application file for complete search history.

(56) References Cited

U.S. PATENT DOCUMENTS 6,097,733 A * 8/2000 Basu et al. .................... 370/468
6,108,314 A 8/2000 Jones et al.

(Continued)

FOREIGN PATENT DOCUMENTS

DE 10120075 A1 11/2002

OTHER PUBLICATIONS

European Patent Office, Communication and European Search Report in Application No. 04017784.2, dated Apr. 10, 2010.

(Continued)

*Primary Examiner* — Meless Zewdu
(74) *Attorney, Agent, or Firm* — Thomas | Horstemeyer, LLP

(57) ABSTRACT

Aspects of the invention provide a system and method for bandwidth management in a hybrid wired/wireless local area network. A method for bandwidth management in a hybrid wired/wireless local area network may include receiving from a first access point and/or a first switch, a first messaging protocol message for establishing a communication session. Responsive to the first messaging protocol message, an available communication bandwidth is determined for at least a portion of the hybrid wired/wireless local area network and bandwidth is allocated to accommodate the communication session. The first access point may be notified of the allocation of bandwidth using a second messaging protocol message. The first messaging protocol message may be received by a second switch and/or a second access point. Bandwidth usage information may be requested from the first access point and/or the first switch using the first messaging protocol message.

22 Claims, 12 Drawing Sheets

(56) References Cited

U.S. PATENT DOCUMENTS

| | | | |
|---|---|---|---|
| 6,850,764 B1* | 2/2005 | Patel | 455/450 |
| 6,978,144 B1* | 12/2005 | Choksi | 455/452.2 |
| 7,089,009 B1* | 8/2006 | Fauconnier | 455/445 |
| 7,089,016 B2* | 8/2006 | Dokko | 455/452.1 |
| 2002/0065082 A1* | 5/2002 | Yegani et al. | 455/452 |
| 2003/0012167 A1* | 1/2003 | Benveniste | 370/338 |
| 2003/0087629 A1 | 5/2003 | Juitt et al. | |
| 2003/0134650 A1* | 7/2003 | Sundar et al. | 455/465 |
| 2003/0210672 A1* | 11/2003 | Cromer et al. | 370/338 |
| 2004/0082338 A1* | 4/2004 | Norrgard et al. | 455/452.2 |

OTHER PUBLICATIONS

Mikkonen et al., "The Magic WAND—Functional Overview", IEEE Journal on Selected Areas in Communications, IEEE Service Center, Piscataway, US, vol. 16, No. 6, pp. 953-972, Aug. 1998, XP011054811, ISSN 0733-8716.

EPO Communication dated Sep. 30, 2010 in Application No. 03752165.5-2413 / 1573927.

Kwak, Joe, "WLAN Handoff Scenarios—Example Handoffs with RRM Measurements and Network Assistance", Internet Citation, Mar. 10, 2003, XP002299878, pp. 1-13.

European Office Action in co-pending, related European application No. 04 017 784.2, mailed Mar. 11, 2013.

\* cited by examiner

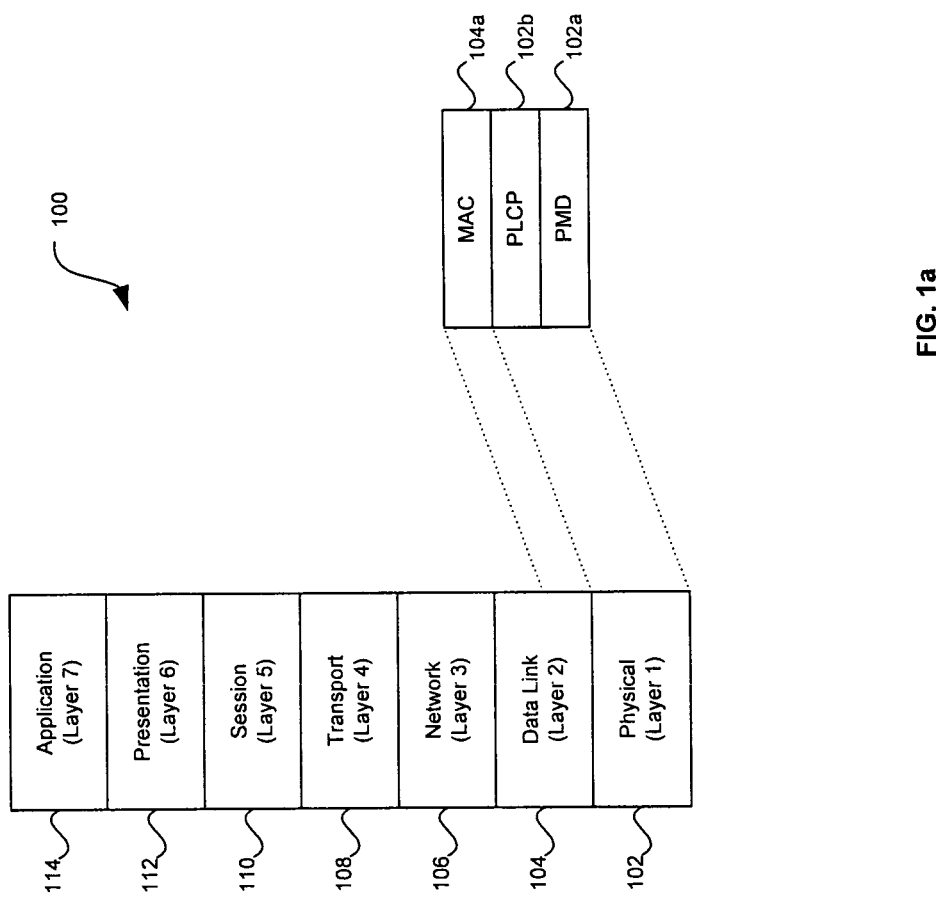

METHOD AND SYSTEM FOR PROVIDING AN INTELLIGENT SWITCH FOR BANDWIDTH MANAGEMENT IN A HYBRID WIRED/WIRELESS LOCAL AREA NETWORK

CROSS-REFERENCE TO RELATED APPLICATIONS/INCORPORATION BY REFERENCE

This application makes reference to, claims priority to and claims the benefit of:

U.S. Provisional Patent Application Ser. No. 60/433,117 entitled "Method and System for Providing an Intelligent Switch for Bandwidth Management in a Hybrid Wired/Wireless Network" filed on Dec. 13, 2002;

U.S. Provisional Patent Application Ser. No. 60/411,261 entitled "Communications Systems Software and Protocols" filed on Sep. 17, 2002;

U.S. Provisional Patent Application Ser. No. 60/411,301 entitled "Method and System for Providing a Scalable Integrated Switch and Wireless Architecture" filed on Sep. 17, 2002; and U.S. Provisional Application Ser. No. 60/435,984 entitled "Communication System and Method in a Wireless Local Area Network" filed on Dec. 20, 2002.

The above stated applications are all incorporated herein by reference in their entirety.

FIELD OF THE INVENTION

Embodiments of the present application relate generally to local area networks, and more particularly to a switching system and method for providing bandwidth management in a hybrid wired/wireless local area network (WLAN).

BACKGROUND OF THE INVENTION

The Open Systems Interconnection (OSI) model promulgated by the International standards organization (ISO) was developed to establish standardization for linking heterogeneous computer and communication systems. The OSI model describes the flow of information from a software application of a first computer system to a software application of a second computer system through a network medium. FIG. 1a is a block diagram 100 of the OSI model. Referring to FIG. 1a, the OSI model has seven distinct functional layers including layer 7, an application layer 114; layer 6, a presentation layer 112; layer 5, a session layer 110; layer 4, a transport layer 108, layer 3, a network layer 106; layer 2: a data link layer 104; and layer 1, a physical layer 102. The physical layer 102 may further include a physical layer convergence procedure (PLCP) sublayer 102b and a physical media dependent sublayer 102a. The data link layer 104 may also include a Medium access control (MAC) layer 104a.

In general, each OSI layer describes certain tasks which are necessary for facilitating the transfer of information through interfacing layers and ultimately through the network. Notwithstanding, the OSI model does not describe any particular implementation of the various layers. OSI layers 1 to 4 generally handle network control and data transmission and reception, generally referred to as end-to-end network services. Layers 5 to 7 handle application issues, generally referred to as application services. Specific functions of each layer may vary depending on factors such as protocol and/or interface requirements or specifications that are necessary for implementation of a particular layer. For example, the Ethernet protocol may provide collision detection and carrier sensing in the physical layer. Layer 1, the physical layer 102, is responsible for handling all electrical, optical, opto-electrical and mechanical requirements for interfacing to the communication media. Notably, the physical layer 102 may facilitate the transfer of electrical signals representing an information bitstream. The physical layer 102 may also provide services such as, encoding, decoding, synchronization, clock data recovery, and transmission and reception of bit streams.

The PLCP layer 102b may be configured to adapt and map services provided by the physical layer 102 to the functions provided by the device specific PMD sublayer 102a. Specifically, the PLCP layer 102b may be adapted to map PHY sublayer service data units (PDSUs) into a suitable packet and/or framing format necessary for providing communication services between two or more entities communicating via the physical medium. The PMD layer 102a specifies the actual methodology and/or protocols which may be used for receiving and transmitting via the physical medium. The MAC sublayer 104a may be adapted to provide, for example, any necessary drivers which may be utilized to access the functions and services provided by the PLCP sublayer 102b. Accordingly, higher layer services may be adapted to utilize the services provided by the MAC sublayer 104a with little or no dependence on the PMD sublayer 102a.

802.11 is a suite of specifications promulgated by the Institute of Electrical and Electronics Engineers (IEEE), which provide communication standards for the MAC and physical (PHY) layer of the OSI model. The 801.11 standard also provides communication standards for wired and wireless local area networks (WLANs). More specifically, the 802.11 standard specifies five (5) types of physical layers for WLANs. These include, frequency hopping spread spectrum (FHSS), direct sequence spread spectrum (DSSS), infrared (IR) communication, high rate direct sequence spread spectrum spread spectrum (HR-DSS) and orthogonal frequency division multiplexing (OFDM). The 802.11 standard also provides a PLCP frame format for each of the specified PHY layers.

Over the past decade, demands for higher data rates to support applications such as streaming audio and streaming video, have seen Ethernet speeds being increased from about 1-2 megabit per second (Mbps), to 10 Mbps, to 100 Mbps, to 1 gigabit per second (Gbps) to 10 Gbps. Currently, there are a number of standards in the suite of specifications, namely 802.11b, 802.11a and 802.11g which have been adapted to facilitate the demands for increased data rates. The 802.11g standard for example, provides a maximum data rate of about 54 Mbps at a transmitter/receiver range of 19 meters (m) in a frequency range of 2.4 GHz to 2.4835 GHz. The 802.11b standard for example, provides a maximum data rate of about 11 Mbps at a transmitter/receiver range of 57 meters (m) in a frequency range of 2.4 GHz to 2.4835 GHz. Finally, the 802.11a standard for example, may be adapted to provide a maximum data rate of about 54 Mbps at a transmitter/receiver range of 12 meters (m) in a 300 MHz segmented bandwidth ranging from 5.150 GHz to 5.350 GHz and from 5.725 GHz to 5.825 GHz.

The 802.11 standard forms the basis of the other standards in the suite of specifications, and the 802.11b, 802.11a and 802.11g standards provide various enhancements and new features to their predecessor standards. Notwithstanding, there are certain elementary building blocks that are common to all the standards in the suite of specifications. For example, all the standards in the suite of specifications utilize the Ethernet protocol and utilize carrier sense multiple access with collision avoidance (CSMA/CA).

CSMA/CA utilizes a simple negotiation scheme to permit access to a communication medium. If a transmitting entity wishes to transmit information to a receiving entity, the transmitting entity may sense the communication medium for communication traffic. In a case where the communication medium is busy, the transmitting entity may desist from making a transmission and attempt transmission at a subsequent time. In a case where the communication transmission is not busy, then the transmitting entity may send information over the communication medium. Notwithstanding, there may be a case where two or more transmission entities sense that the communication medium is not busy and attempt transmission at the same instant. To avoid collisions and retransmissions, a CSMA/OA or ready to send (RTS) and clear to send (CTS) messaging scheme may be employed, for example. Accordingly, whenever a transmitting device senses that the communication medium is not busy, then the transmitting device may send a ready to send message to one or more receiving device. Subsequent to the receipt of the ready to send message, the receiving device may send a clear to send message. Upon receipt of the clear to send message by the transmitting device, the transmitting device may initiate transfer of data to the receiving device. Upon receiving packets or frames from the transmitting device, the receiving device may acknowledge the received frames.

The 802.11b standard, commonly called Wi-Fi, which represents wireless fidelity, is backward compatible with its predecessor standard 802.11. Although 802.11 utilizes one of two modulation formats including direct sequence spread spectrum (DSS) using differential binary phase shift keying and frequency hopping spread spectrum (11-bit Barker sequence), 802.11b utilizes a higher data rate form of DSS called complementary code keying (CCK). CCK permits higher data rate and particularly less susceptible to interference effects such as multipath-propagation interference, the PSK.

802.11a utilizes orthogonal frequency-division multiplexing (OFDM) modulation/encoding scheme, which provides a maximum data rate 54 Mbps. Orthogonal frequency-division multiplexing is a digital modulation technique which splits a signal into several narrowband channels, with each channel having a different frequency. Each narrowband channel is arranged so as to minimize the effects of crosstalk between the channels and symbols in the data stream.

Since equipment designed to provide support for 802.11a operates at frequencies in the ranges 5.150 GHz to 5.350 GHz and from 5.725 GHz to 5.825 GHz, 802.11a equipment will not interoperate with equipment designed to operate with the 802.11b standard which defines operation in the 2.4 to 2.4835 GHz frequency band. One major drawback is that companies that have invested in 802.11b equipment and infrastructure may not readily upgrade their network without significant expenditure.

The 802.11g standard was developed as an extension to 802.11b standard. The 802.11g standard may utilize a similar OFDM modulation scheme as the 802.11a standard and delivers speeds comparable with the 802.11a standard. Since 802.11g compatible equipment operates in the same portion of the electromagnetic spectrum as 802.11b compatible equipment, 802.11g is backwards compatible with existing 802.11b WLAN infrastructures. Due to backward compatibility of 802.11g with 802.11b, it would be desirable to have an 802.11b compliant radio card capable of interfacing directly with an 802.11g compliant access point and also an 802.11g compliant radio card capable of interfacing directly with an 802.11b compliant access point.

Furthermore although 802.11g compatible equipment operates in the 2.4 GHz to 2.4835 GHz frequency range, a typical transmitted signal utilizes a bandwidth of approximately 22 MHz, about a third or 30% of the total allocated bandwidth. This limits the number of non-overlapping channels utilized by an 802.11g access point to three (3). A similar scenario exists with 802.11b. Accordingly, many of the channel assignment and frequency reuse schemes associated with the 802.11b standard may be inherent in the 802.11g.

RF interference may pose additional operational problems with 802.11b and 802.11g equipment designed to operate in the 2.4 GHz portion of the electromagnetic spectrum. The 2.4 GHz portion of the spectrum is an unlicensed region which has been utilized for some time and is crowded with potential interfering devices. Some of these devices include cordless telephone, microwave ovens, intercom systems and baby monitors. Other potential interfering devices may be Bluetooth devices. Accordingly, interference poses interference problems with the 802.11b and 802.11g standards.

802.11a compatible equipment utilizes eight non-overlapping channels, as compared to three non-overlapping channels utilized by 802.11b. Accordingly, 802.11a access points may be deployed in a more dense manner than, for example 802.11b compatible equipment. For example, up to twelve access points each having a different assigned frequency may be deployed in a given area without causing co-channel interference. Consequently, 802.11a may be particularly useful in overcoming some of the problems associated with channel assignment, especially in areas that may have a dense user population and where increased throughput may be critical. Notwithstanding, the higher operating frequency of 802.11a causes more attenuation resulting in a shorter operating range at a given data rate. This may significantly increase deployment cost since a larger number of access points are required to service a given service area.

In hybrid wired/wireless network systems that may utilize one or more protocols in the 802.11 suite of protocols, the mobility of access devices throughout the network may pose additional challenges for conventional switches and switching equipment. Since access devices are continuously changing their point of access to the network, conventional switches may not have the capability to control other network devices and/or entities to provide seamless communication throughout the network. Allocation and de-allocation of certain network resources can be challenging in a continuously changing network. Moreover, particularly in network systems that may handle large volumes of access device traffic, conventional switching and signaling may consume significant amounts of system resources and this may reduce the amount of available system resources, thereby effectively reducing system throughput and performance.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Aspects of the invention provide a system and method for bandwidth management in a hybrid wired/wireless local area network. A method for bandwidth management in a hybrid wired/wireless local area network may include receiving from a first access point and/or a first switch, a first messaging protocol message for establishing a communication session. Responsive to the first messaging protocol message, determining an available communication bandwidth for at least a portion of the hybrid wired/wireless local area network and allocating bandwidth to accommodate the communication session. The first access point may be notified of the allocation of bandwidth using a second messaging protocol message. The first messaging protocol message may be received by a second switch and/or a second access point. Bandwidth usage information may be requested from the first access point and/or the first switch using the first messaging protocol message.

The allocated bandwidth may be de-allocated using a third messaging protocol message upon termination of the established communication session. The third messaging protocol message may be sent from the second switch and/or the second access point to the first switch and/or the first access point. Bandwidth information may be received from at least one of a quality of service management process, a load balancing management process, a session control process, and a network management process using a fourth messaging protocol message. The bandwidth information may be requested from any one or more of the quality of service management process, the load balancing management process, the session control process, and the network management process using a fifth messaging protocol message. The first, second, third, fourth and fifth messaging protocol messages may be at least one of an access point status message, access point configuration message, a switch status message, a switch configuration message, a client status message and a device discovery message.

Another embodiment of the invention may provide a machine-readable storage, having stored thereon a computer program having at least one code section for providing bandwidth management for a switch in a hybrid wired/wireless local area network, where the at least one code section is executable by a machine for causing the machine to perform the steps described above.

Another embodiment of the invention may provide a system for bandwidth management in a hybrid wired/wireless local area network. The system may include a receiver adapted to receive from a first access point and/or a first switch, a first messaging protocol message for establishing a communication session. One or more controllers may be adapted to determine an available communication bandwidth for at least a portion of the hybrid wired/wireless local area network. At least one of the controllers may determine the available bandwidth in response to the first messaging protocol message. Additionally, at least one of the controllers may be adapted to allocate bandwidth to accommodate the communication session and/or notify the access point of the allocated bandwidth using a second messaging protocol message.

The receiver may be further adapted to receive the first messaging protocol message by the second switch and/or a second access point. At least one of the controllers may be adapted to request bandwidth usage information from the first access point and/or the first switch using a first messaging protocol message. One or more of the controllers may be adapted to de-allocate the allocated bandwidth using a third messaging protocol message subsequent to termination of the established communication session. The third messaging protocol message may be sent from the second switch and/or the second access point to at least one of the first switch and the first access point by one or more of the controllers.

The receiver may be adapted to receive bandwidth information from any one or more of a quality of service management process, a load balancing management process, a session control process, and a network management process using a fourth messaging protocol message. At least one controller may be adapted to request the bandwidth information from the quality of service management process, the load balancing management process, the session control process, and the network management process using a fifth messaging protocol message. The first, second, third, fourth and fifth messaging protocol messages may be any one or more of an access point status message, access point configuration message, a switch status message, a switch configuration message, a client status message and a device discovery message. The may be a bandwidth management controller, a quality of service controller at least one controller, a load balancing controller a session controller and a network management controller.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 1a is a block diagram of the OSI model.

DETAILED DESCRIPTION OF THE INVENTION

Aspects of the invention provide a system and method for bandwidth management in a hybrid wired/wireless local area network. A method for bandwidth management in a hybrid wired/wireless local area network may include receiving from a first access point and/or a first switch, a first messaging protocol message for establishing a communication session. Responsive to the first messaging protocol message, an available communication bandwidth is determined for at least a portion of the hybrid wired/wireless local area network and bandwidth is allocated to accommodate the communication session. The first access point may be notified of the allocation of bandwidth using a second messaging protocol message. The first messaging protocol message may be received by a second switch and/or a second access point. Bandwidth usage information may be requested from the first access point and/or the first switch using the first messaging protocol message.

Figure 1B:
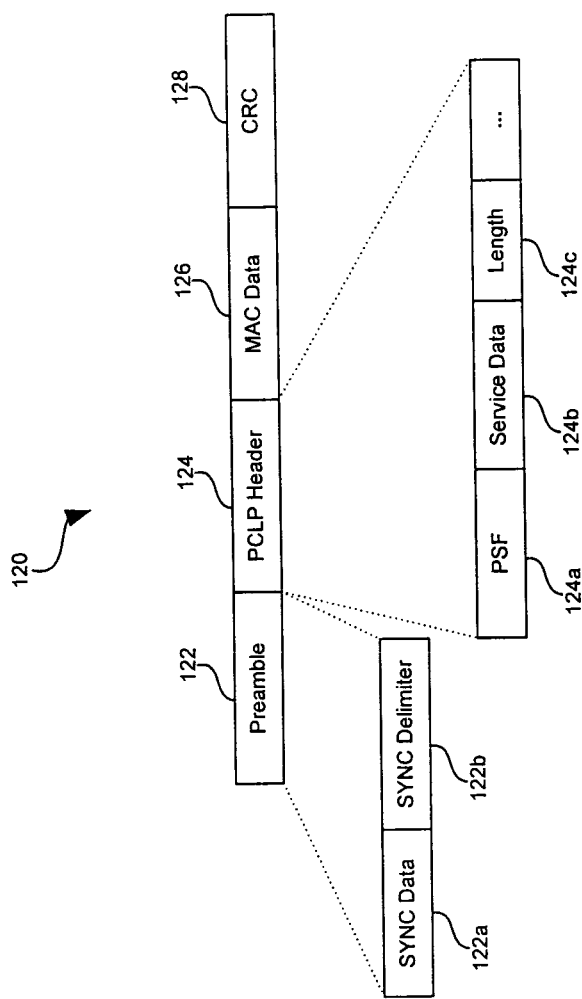
FIG. 1b is a block diagram illustrating a general PLCP frame as defined by 802.11.

FIG. 1b is a block diagram 120 illustrating a general PLCP frame as defined by 802.11. Referring to FIG. 1b, there is shown preamble 122, PLCP header 124, MAC data 126, and CRC 128. Preamble 122 may include synchronization (SYNC) data 122a and synchronization delimiter 122b. The PLCP header 124 may include, for example PLCP signal field (PSF) 124a, service data 124b, length 124c and other fields. The preamble 122 may be dependent on the PHY. The SYNC data 122a may include a unique bit stream that may be adapted to signal timing parameters such as the start of a frame. The SYNC data 122a is used for bit synchronization and demodulation. The SYNC delimiter 122b provides frame timing information and may be adapted to delimit the end of synchronization information. The PLCP header 124 may be adapted to contain information used for decoding the frame. For example, the PSF 124a may be adapted to include communication data rate information. The service data 124b is generally reserved, but may be utilized to provide application specific functionality. The length 124c may be adapted to indicate the length of the MAC data 126. In this regard, the length 124c may be expressed in terms of the time required to transmit the MAC data 126.

Figure 1C:
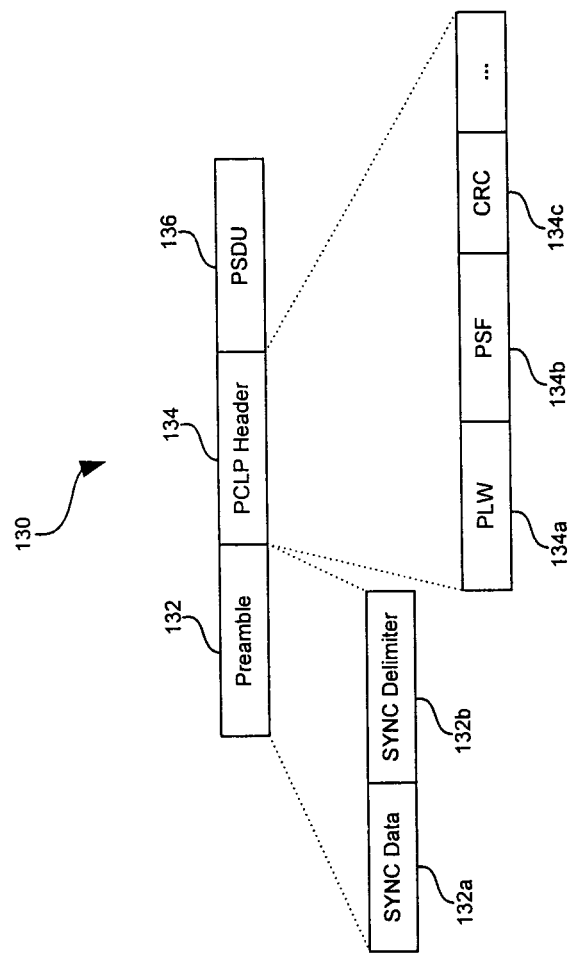
FIG. 1c is a block diagram illustrating a PLCP frame utilized by frequency hopping spread spectrum as defined by 802.11.

FIG. 1c is a block diagram 130 illustrating a PLCP frame utilized by frequency hopping spread spectrum as defined by 802.11. Referring to FIG. 1c, there is shown a SYNC data 132, PLCP header 134 and PSDU 136. The PLCP header 134 may include, for example, PSDU length word (PLW) 134a, PLCP signaling field (PSF) 134b, header error check field or CRC 134c and other fields. The PLW 134a may specify the number of octets contained in the PSDU 136. The PSF 134b may be 4-bits in length and may be used to denote the communication data rate.

Figure 1D:
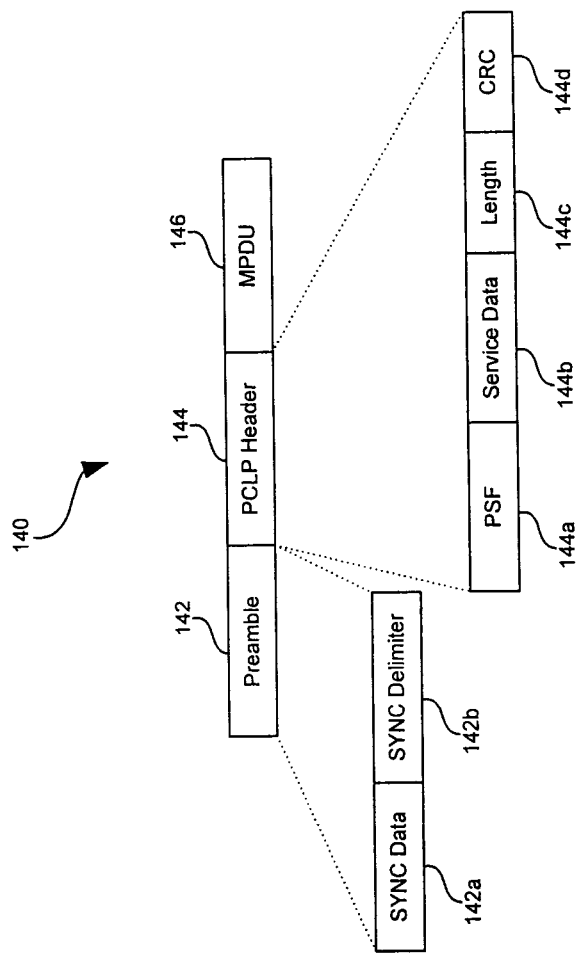
FIG. 1d is a block diagram illustrating a PLCP frame for direct sequence spread spectrum and high rate direct sequence spread spectrum as defined by 802.11.

FIG. 1d is a block diagram 140 illustrating a PLCP frame for direct sequence spread spectrum and high rate direct sequence spread spectrum (HR-DSS) as defined by 802.11. Referring to FIG. 1d, there is shown preamble 142, PLCP header 144 and MPDU 146. Preamble 142 may include synchronization (SYNC) data 142a and synchronization delimiter 142b. The PLCP header 144 may include PLCP signal field (PSF) 144a, service data 144b, length 144c, and CRC field 144d. The SYNC data 142a may be 128 bits as compared to 8 bits for SYNC data 132a for frequency hopping spread spectrum. The CRC 144d is 16 bits, which is similar to CRC 134c for frequency hopping spread spectrum.

Figure 1E:
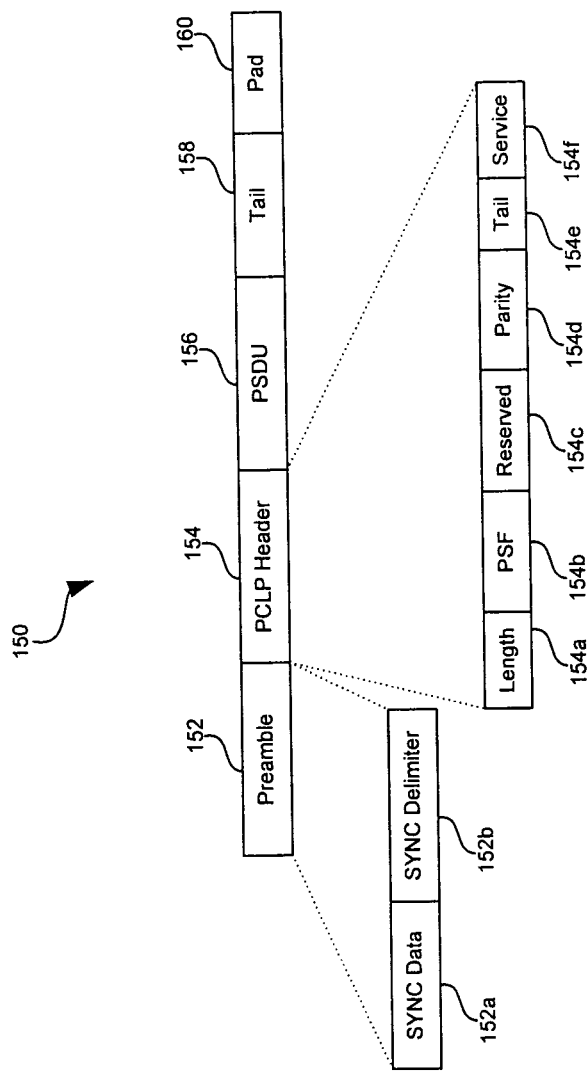
FIG. 1e is a block diagram illustrating a PLCP frame for orthogonal frequency division multiplexing as defined by 802.11.

FIG. 1e is a block diagram 150 illustrating a PLCP frame for orthogonal frequency division multiplexing as defined by 802.11. Referring to FIG. 1e, there is shown preamble 152, PLCP header 154 and PSDU 156, tail 158 and pad 160. Preamble 152 may include synchronization (SYNC) data 152a and synchronization delimiter 152b. The PLCP header 154 may include length 154a, PLCP signal field (PSF) 154b, reserved field 154c, parity 154d, tail 154e and service 154f. The length 154a is a 12-bit field that may be adapted to indicate the length of the frame. The PSF 154b is a 4-bit field that may indicate a modulation scheme utilized and its associated coding rate of the PSDU. For example, the specification utilizes binary 1011 to represent 6 Mbps, 1111 to represent 9 Mbps, 1010 to represent 12 Mbps, 1110 to represent 18 Mbps, 1001 to represent 24 Mbps, 1011 to represent 36 Mbps, 1000 to represent 48 Mbps and finally, 1100 to represent the maximum standardized rate if 54 Mbps. The reserved field 154c is a 1 bit field that is reserved for future use and may be adapted for application specific use. The parity field 154d may indicate odd or even parity. The tail field 154e is a 6-bit field. The service field 154f is a 16-bit field that may be adapted to indicate the type of service.

In a typical wireless local area network, especially as access devices become mobile throughout the network, channel capacity may be rapidly time varying. For example, when the distance from an access device to an access point increases or decreases due to mobility, the channel capacity and ultimately the channel throughput may change with time. In accordance with an embodiment of the invention, a switch is provided to facilitate communication between one or more of a plurality of access devices and/or access points, and/or other switches. The switch may utilize a messaging protocol, which may be adapted to facilitate tasks such as, switch filter transfer, bandwidth management, session control and management, load balancing and/or QoS control and management.

Referring to the task of bandwidth management, in a hybrid wired/wireless LAN in which bandwidth usage may be rapidly changing over time due to the mobility of access devices, the switch, in accordance with an aspect of the invention, may be configured to perform bandwidth management for a wired and/or a wireless portion of the network. The task of bandwidth management may involve performing one or more activities including, but not limited to, allocating and de-allocating bandwidth, implementing policies, tracking bandwidth usage and adapting bandwidth allocation to meet user demands and system capability. The management of these activities may be directly or indirectly related to providing mobility and operability throughout a wired or wireless LAN, or a hybrid combination thereof.

Figure 2:
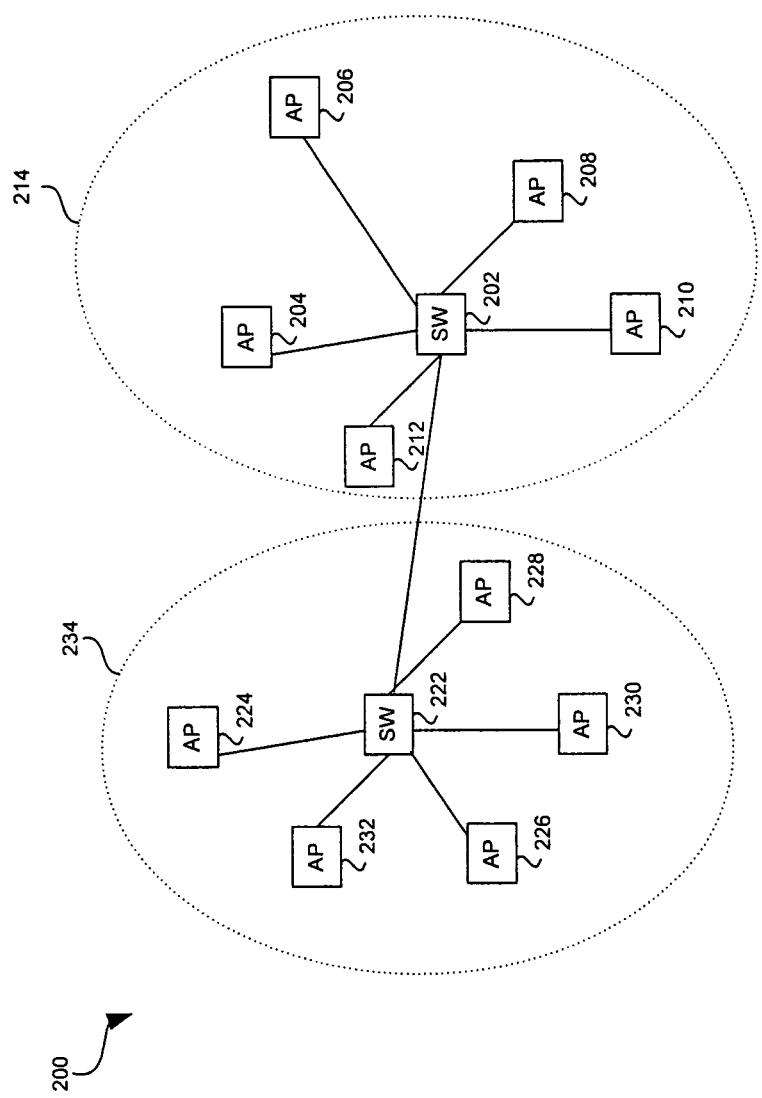
FIG. 2 is a block diagram of an exemplary system for network management in a wireless local area network in accordance with an embodiment of the invention.

FIG. 2 is a block diagram of an exemplary system for network management in a wireless local area network in accordance with an embodiment of the invention. Referring to FIG. 2, there is illustrated a first networking domain 214 and a second networking domain 234. The first networking domain 214 may include a switch 202, and access points 204, 206, 208, 210, 212. Each of access points 204, 206, 208, 210, 212 may be coupled to the switch 202. The second networking domain 234 may include a switch 222, and access points 224, 226, 228, 230, 232. Each of access points 224, 226, 208, 230, 232 may be coupled to the switch 222. Switch 222 may be coupled to switch 202 through any one or more of a wired and a wireless medium. Although not shown, at least some of the access points in any one of the networking domains 214, 234 may be coupled to each other. Notwithstanding, a plurality of actual and/or virtual channels may be provided to facilitate communication with the access points and switches. Although the networking domains 214 and 234 are illustrated as separate networking entities, the invention is not so limited. Accordingly, the networking domain 214, 234 may be part of a single networking entity, but may represent separate security domains within the single networking entity.

In operation, any one or more of the switches 202, 222 may be adapted to send network management related information and parameters to any one or more of the access points in any one or more of the networking domains 214, 234. In one embodiment of the invention, for example, switch 202 may be adapted to communicate bandwidth information to access point 206. Similarly, switch 202 may be adapted to send network management related information to any one or more of access points 204, 208, 210, 214. Similarly, switch 222 may be adapted to communicate network management related information to any one or more of access points 224, 226, 228, 230, 232. The bandwidth information and/or network management related information may be used by an access point to efficiently allocate and/or de-allocate bandwidth for associating and/or dissociating access devices.

In another aspect of the invention, the switches 202, 222 may be adapted to provide, for example, certain QoS management activities to the access points using for example a messaging protocol. Accordingly, some activities such as bandwidth policing, bandwidth management, load balancing, roaming and handover may be handled by coordinating one or more switches and one or more access points utilizing, for example, the messaging protocol. Notwithstanding, a switch for example, switch 222, may be configured to establish rules that may be adapted by the access points 224, 226, 228, 230, 232 in carrying out these activities. The rules may be propagated from the switches 222, 202 to the access points 204, 208, 210, 214, 224, 226, 228, 230, 232 using, for example, the messaging protocol. Prioritization and processing, for example, may be based on acceptable levels of latency and bandwidth availability. For example, an IP telephone call may be assigned highest queuing and processing priority in order to minimize latency. Policing, for example, may include performing activities which may limit and control the usage of available bandwidth by a particular access device or a type of access device. These and other tasks may be controlled by the switch using the messaging protocol. Although activities such as policing and QoS management may be conducted independently of the bandwidth management, in accordance with an aspect of the invention, QoS management related information may be utilized for bandwidth management.

In operation, any one or more of the access points in any one or more of the networking domains may be adapted to acquire various bandwidth related information and parameters and communicate the bandwidth related information to one or more of the switches 202, 222. In one embodiment of the invention, for example, access point 206 may be adapted to acquire various bandwidth related information and communicate the acquired information back to the switch 202. Similarly, any one or more of access points 204, 208, 210, 214 may acquire various bandwidth related information and parameters and communicate the acquired information to switch 202. In another aspect of the invention, any one or more of access points 224, 226, 228, 230, 232 may acquire various bandwidth related information and parameters and communicate the acquired information to the switch 222.

In another embodiment of the invention, any one or more of access points 224, 226, 228, 230, 232 may acquire various bandwidth related information and parameters and communicate the acquired information to the switch 202 through switch 222. This may be particularly useful in, for example, a roaming scenario or handoff scenario. In both the roaming and handoff scenarios where a particular access device is roaming or being handed off from networking domain 234 to networking domain 214, it may be advantageous to acquire bandwidth related information pertaining to networking domain 214 before permitting an access device to acquire service from networking domain 214. In this case, switch 222 may initiate a query requesting bandwidth related information from switch 202. Consequently, switch 222 may request bandwidth related information from any one or more of access points 204, 206, 208, 210, 212. Once switch 202 gets the bandwidth related information from these access points, it may communicate the information to the switch 222. Accordingly, the switch 222 may decide whether to handoff or permit roaming depending on the bandwidth related information received from the switch 202.

Based on bandwidth related information received from one or more access devices or switches, a switch may be adapted to force an access device to roam. For example, in a case where the switch determines that there may be insufficient bandwidth or channel capacity, then the switch may be adapted to dynamically force existing and/or new incoming access devices to roam. In one aspect of the invention, a list of devices which have been forced to roam may be maintained. Accordingly, if a switch determines that there is sufficient channel capacity available, then the switch may be adapted to signal or notify devices on the list to reattempt establishment of service and permit access to the service provided by the network. In this regard, any one or more of the switches 202, 222 may be adapted to determine the total available bandwidth for any one or more of a plurality of access points and/or switches. Accordingly, the switches 202 and/or 222 may provide channel/frequency management and quality of service QoS management in order to optimize bandwidth utilization for a plurality of access devices.

In another embodiment of the invention, based on various bandwidth related information, an access prioritization scheme may be adapted and enforced by, for example, any one or more of the switches 202, 222. The prioritization scheme may include, establishing a priority for all network traffic, honoring prioritized traffic from all clients, and/or honoring prioritized traffic from some select clients such as trusted clients. In another aspect of the invention, the switches 202, 222 may be adapted to provide certain QoS management activities to the access points. Accordingly, some activities such as bandwidth policing, bandwidth management, packet prioritization and processing, and service type queuing may be handled by an access point. Notwithstanding, a switch may be adapted to establish rules that may be utilized by the access points in carrying out these activities. Prioritization and processing, for example, may be based on acceptable levels of latency and bandwidth availability. For example, an IP telephone call may be assigned highest queuing and processing priority in order to minimize latency. Policing, for example, may include tasks which limit and control the usage of available bandwidth by a particular access device or a type of access device.

In accordance with an aspect of the invention, the switch may utilize the messaging protocol (MP) to provide enhanced communication services to one or more of a plurality of access devices or mobile stations in, for example, an enterprise Wireless LAN (WLAN). The enhanced communication, in addition to ordinary WLAN device communication such as authentication, authorization, key exchanges, beacon broadcast, etc., may provide additional features not provided by a WLAN to its clients. These additional features may include, but are not limited to, bandwidth management, access control, load balancing, network management and quality of service. In addition to switches, other enterprise WLAN devices that may utilize messaging protocol message transactions may include but are not limited to, wireless access points, enterprise switches and wireless stations. These devices may be messaging protocol enabled in certain instances.

In accordance with an aspect of the invention, an exemplary WLAN Architecture may be provided. In the enterprise Wireless LAN environment, the wireless devices may be located at the edge of the network. The wireless devices may be connected or coupled to the enterprise network via the one or more access points, which in turn may be the edge devices of, for example, a wired LAN. The access points may be connected to the LAN via switches. These switches, which may be called wireless LAN switches, and in certain instances, may not only perform Layer 2 switching, but may be adapted to function as a wireless edge manager. They may also provide additional functionalities such as bandwidth management, access control, firewall functions, traffic privacy and quality of service (QoS), network management, and load balancing.

Figure 3:
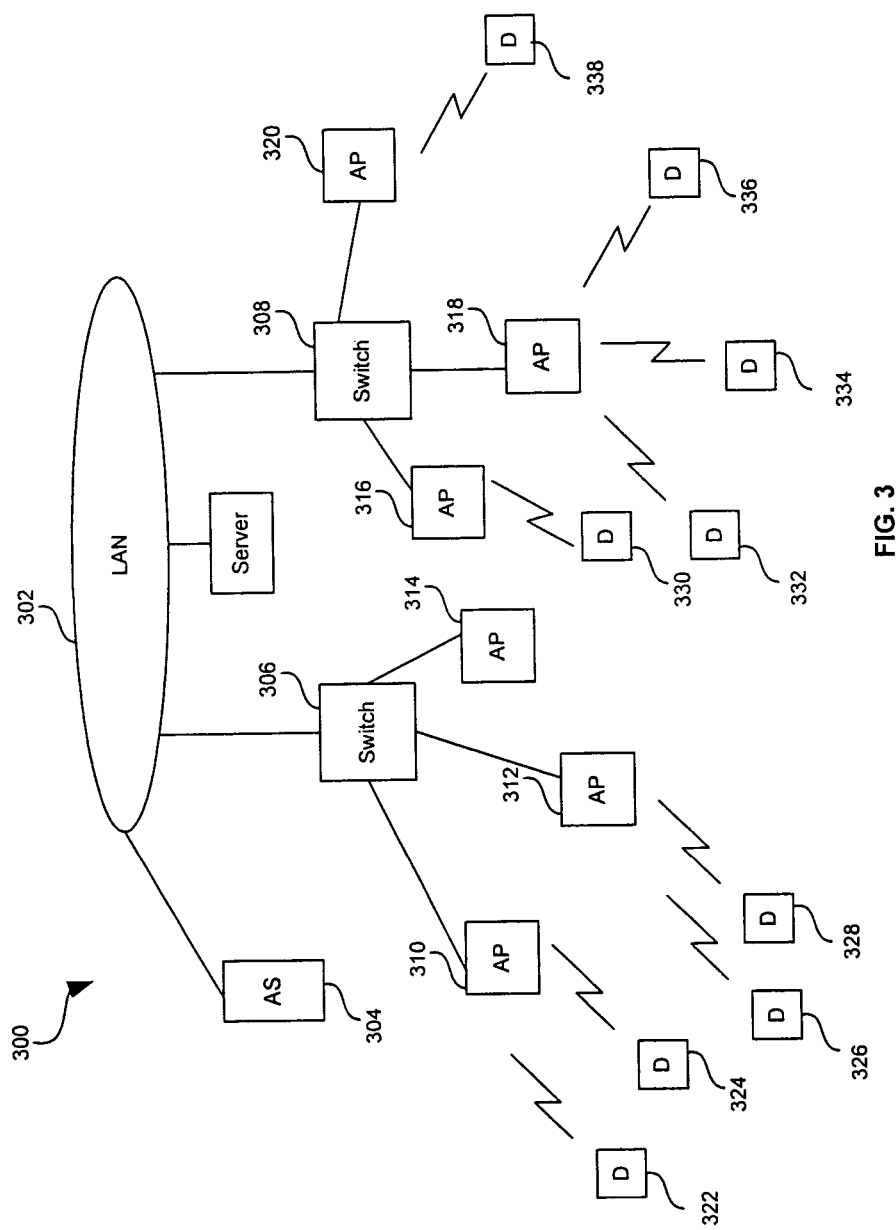
FIG. 3 is a block diagram of an exemplary Enterprise Wireless LAN having switches serving as the edge managers in accordance with an embodiment of the invention.

FIG. 3 is a block diagram 300 of an exemplary Enterprise Wireless LAN having switches serving as the edge managers in accordance with an embodiment of the invention. Referring to FIG. 3, there is shown, a local area network (LAN) 302, authentication server 304, switches 306, 308, access points (APs) 310, 312, 314, 316, 318, 320 and access devices 322, 324, 326, 328, 330, 332, 334, 336, 338. It should be recognized that the invention is not limited to and Enterprise WLAN. The invention may be applicable to a wired LAN, a wireless LAN and any combination thereof.

Wireless transmission or communication between the access devices or clients, and the access points may be secure. This may be also be true for the wired connections between any of the access points 310, 312, 314, 316, 318, 320 and the switches 306, 308. The switches 306, 308 and access points 310, 312, 314, 316, 318, 320 may be adapted to communicate using, for example, an Ethernet protocol. From the switch's perspective, the switch may be switching regular layer 2 frames. However, within the switch, knowledge of a WLAN and its management intelligence may reside primarily in software. Notwithstanding, the invention is not limited in this regard.

Figure 4:
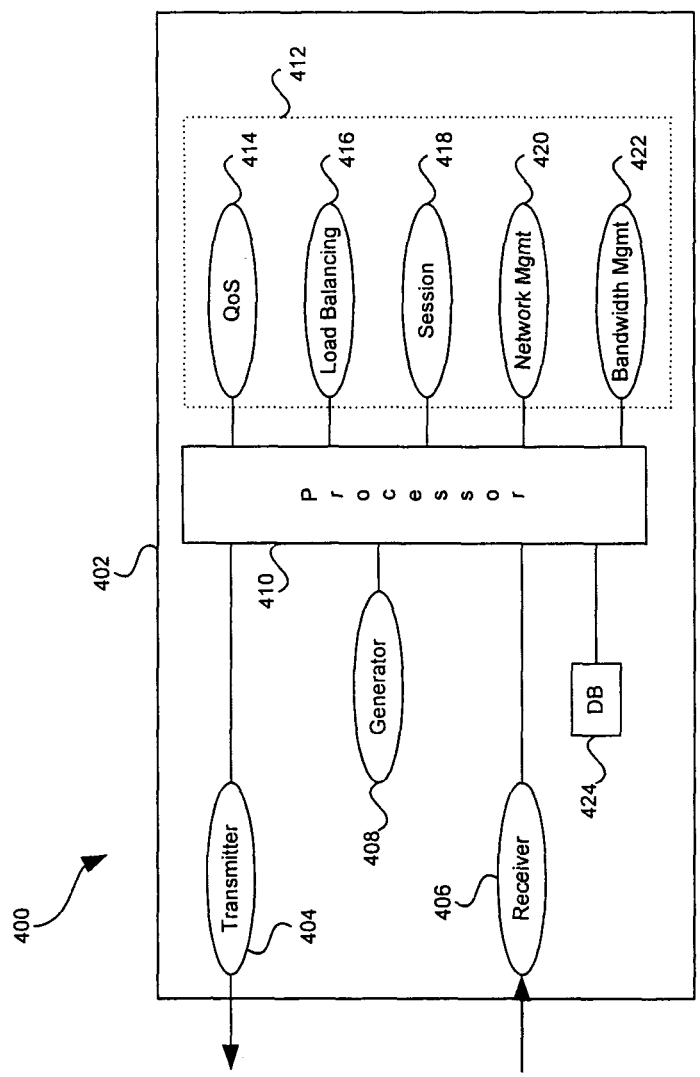
FIG. 4 is a block diagram of an exemplary switch as illustrated in FIG. 2 and FIG. 3 in accordance with an aspect of the invention.

FIG. 4 is a block diagram 400 of an exemplary switch 402 as illustrated in FIG. 2 and FIG. 3 in accordance with an embodiment of the invention. Referring to FIG. 4, switch 402 may include a processor 410, transmitter 404, receiver 406, generator 408 and controller 412. The controller 412 may include bandwidth controller 422, QoS controller 414, load balancing controller 416, session controller 418 and network management controller 420. The transmitter 404, receiver 406, generator 408 and the components of the controller 412, namely QoS controller 414, load balancing controller 416, session controller 418 and network management controller 420, may be variously coupled to processor 410.

The components of switch 402 may include suitable circuitry and/or software capable of implementing the various functions, including but not limited to, bandwidth management, QoS management, load balancing, session management and control, and network management. Notwithstanding, although the components of the switch 402 are individually shown, the invention is not limited in this regard. For example, with suitable software and/or logic, the generator function 408 may be implemented solely by the processor 422. Similarly, any one or more of the bandwidth management, QoS management, load balancing, session management and control, and network management may be integrated and with suitable logic and/or software, may be executed by the processor 410.

In operation, the transmitter 404 may be adapted to send a first messaging protocol message between a first switch and a first access point. The receiver 406 may be adapted to receive a second messaging protocol message from the first access point and the first switch. In response to the transmittal of the first messaging protocol message, a second messaging protocol message may be received. The controller 412 may be adapted to allocate bandwidth for one or more devices using any one or more of the first second and/or third messaging protocol messages. These devices may include but are not limited to the first switch, a second switch, the first access point, the second access point, and one or more access devices.

The generator 408 may be adapted to generate the first messaging protocol message by the first switch. The receiver 406 may be adapted to receive the second messaging protocol message from a second switch. The processor 410 may be adapted to control the transmitter 404, the receiver 406, the controller 412 and the generator 408. The processor 410 may utilize one or more messaging protocol messages to control transmitter 404, receiver 406, generator 408, bandwidth controller 422, QoS controller 414, load balancing controller 416, session controller 418 and network management controller 420.

In accordance with an aspect of the invention, the switch may be adapted to facilitate bandwidth management by utilizing a messaging protocol. The messaging protocol may utilize one or more protocols associated with a device communication protocol (DCP) umbrella (DCPU). The messaging protocol utilized by the switch may be adapted to run over the transmission control protocol (TCP) or user datagram protocol (UDP) using for example, a well-known port number specified under the framework of the device communication protocol. Under the DCP umbrella, there may be several sub-protocols defined for the purpose of facilitating interoperability with other products. Some of these products may include but are not limited to, cable modems and cable modem termination systems (CMTS) equipment. The messaging protocol utilized by the switch may be adapted to include the necessary protocols under DCP to facilitate communication for wired and/or WLAN devices.

In accordance with an aspect of the invention, the switch may utilize the messaging protocol to facilitate bandwidth management between various wireless networking devices and/or clients, and to facilitate bandwidth management the devices and/or clients. In an embodiment of the invention, one or more of WLAN switches 306, 308 may be adapted to utilize the messaging protocol to facilitate communication with one or more of the access points 310, 312, 314, 316, 318, 320 of FIG. 3. Information exchanged between these two devices may include, but is not limited to, control, configuration and status information of the devices and also client session information. At least some of this information may be used for bandwidth management. The control information may include, for example, signaling information that may be communicated in-band or out-of-band.

The switch may utilize the messaging protocol, which may include a plurality of message types. In accordance with an aspect of the invention, the switch may utilize a messaging protocol that may include, for example, six (6) categories of messages or message types. Notwithstanding, the invention is not so limited. These messages and their usage may be illustrated as follows:

AP_Status: From AP to Switch or AP
    An AP_Status message may be used to indicate, for example, an access point capacity, bandwidth allocation, the number of attached clients, signal strength, power levels, etc.

AP_Config: From Switch to AP
    An AP_Config message may be used to configure an access point to accommodate a client. This may include but is not limited to, 802.11e QoS, security information, etc.

Switch_Status: From Switch to Switch
    A Switch_Status message may be used to indicate a switch's association with one or more clients. This may include but is not limited to, client session information, access control, QoS parameters, etc.

Switch_Config: From Switch to Switch
  A Switch_Config message may be used to configure a switch such as a WLAN Switch to accommodate a client. The may include but is not limited to, access control, QoS configuration, etc.
Client_Status: From AP to Switch
  A Client_Status message may be used to indicate a client's information. This may include but is not limited to, client identification, associated MAC address, session status, connecting location, etc.
Device_Discovery: Any Device to Any Device
  In a client-server model of network services, the Device-_Discovery message may be used by a switch and/or a server to discover clients or by client to discover servers. The message may be broadcast to some or all devices in the subnet to draw responses from the intended devices.

In each of the message types above, the message may include, for example four (4) message subtypes—.request, .data, alert, and .ack. A message type/subtype pair of .request and .data may represent the request of data and a corresponding response of data itself. The subtype pair of .alert and .ack may represent the voluntary transmission of data and its acknowledgement. Additionally, there may be two conventions utilized in a message exchange sequence. Accordingly, if a message exchange sequence starts with a request (.req), it may be followed by a reactive transmission of data (.data). Similarly, if a message exchange sequence starts with a proactive transmission of data (.alert), it is followed by an acknowledgement (.ack). In accordance with an aspect of the invention, one or more message types and/or subtype may be used to facilitate bandwidth management.

U.S. patent application Ser. No. 10/607,094 entitled "Communication System and Method in a Hybrid Wired/Wireless Local Area Network" filed on Jun. 26, 2003, discloses a messaging protocol that may be utilized by the switch in accordance with an embodiment of the invention, and is incorporated herein by reference in its entirety. Exemplary valid fields and subfields for various messaging protocol messages that may be utilized by the switch in accordance with an aspect of the invention are disclosed therein. Additionally, U.S. patent application Ser. No. 10/658,140 entitled "Method and System for Providing an Intelligent Switch in a Hybrid Wired/Wireless Local Area Network" filed on Sep. 9, 2003, discloses a messaging protocol that may be utilized by the switch in accordance with an embodiment of the invention, and is incorporated herein by reference in its entirety. The switch disclosed therein may be adapted to utilize the messaging protocol to provide bandwidth management in accordance with an embodiment of the invention.

In another embodiment of the invention, the switch may include a network management controller that may be configured for network management and may provide valuable information that may be utilized for bandwidth management in accordance with an embodiment of the invention. In this regard, the switch may be adapted to utilize, for example, the messaging protocol to transfer networking monitoring and/or status messages such as SNMP and RMON statistics from an old attachment or connection point to a new connection point. In this regard, the switch may be configured to use the messaging protocol to enable location-specific management of at least certain clients and/or network devices. In this regard, the switch may send client association information to a central management entity which may be aware of the location of the various access points and/or switches in the network. This information may be disseminated to, for example a bandwidth controller, a QoS controller and/or a load balancing controller. Accordingly, a decision may subsequently be made to determine whether to allow or disallow access from certain locations in order to maximize bandwidth usage, balance a load within the network and/or provide a specified QoS.

For example, information pertaining to at least some detected clients may be transferred to the switch. Accordingly, a load balancing manager and/or controller located in the switch may use this information to achieve efficient load balancing. In this regard, the load balancing controller may include suitable circuitry and/or software that may be adapted to receive and assess various client information and effectuate an efficient load balancing. Parameters such as signal strength, access level and device type, may be indicative of the information that may be used to effectuate efficient load balancing. Client association/dissociation information may be communicated between the load balancing manager and one or more access points and/or switches. Once the load-balancing manager determines an optimal load configuration, new client and/or access point association information may be passed to the various access points in the network using messaging protocol messages.

In another embodiment of the invention, the switch may include a QoS controller that may be configured to utilize the messaging protocol to transfer QoS parameters from an original switch port to a new switch port, in order to facilitate roaming. One or more switches in the network may be adapted to facilitate roaming between various access points located in the same network or between different networks. This may affect the QoS handling of, for example, downstream traffic destined for the roaming client or access device. In this regard, a switch may be adapted to utilize one or more messaging protocol messages to automatically transfer various pertinent network management parameters between access points and or other switches. This centralized may eliminate a need for a distributed management interface, thereby providing a more robust communication system.

In another embodiment of the invention, to facilitate roaming, a switch may be adapted to utilize the messaging protocol to transfer QoS parameters from an old access point to a new access point. This may affect upstream traffic from the client to an access point. In this regard, the switch may utilize one or more messaging protocol messages to transfer QoS parameters from the old access point to the new access point. Since this handling of QoS parameters may be similar to the handling of client traffic, the messaging protocol may be used to provide seamless roaming.

Figure 5:
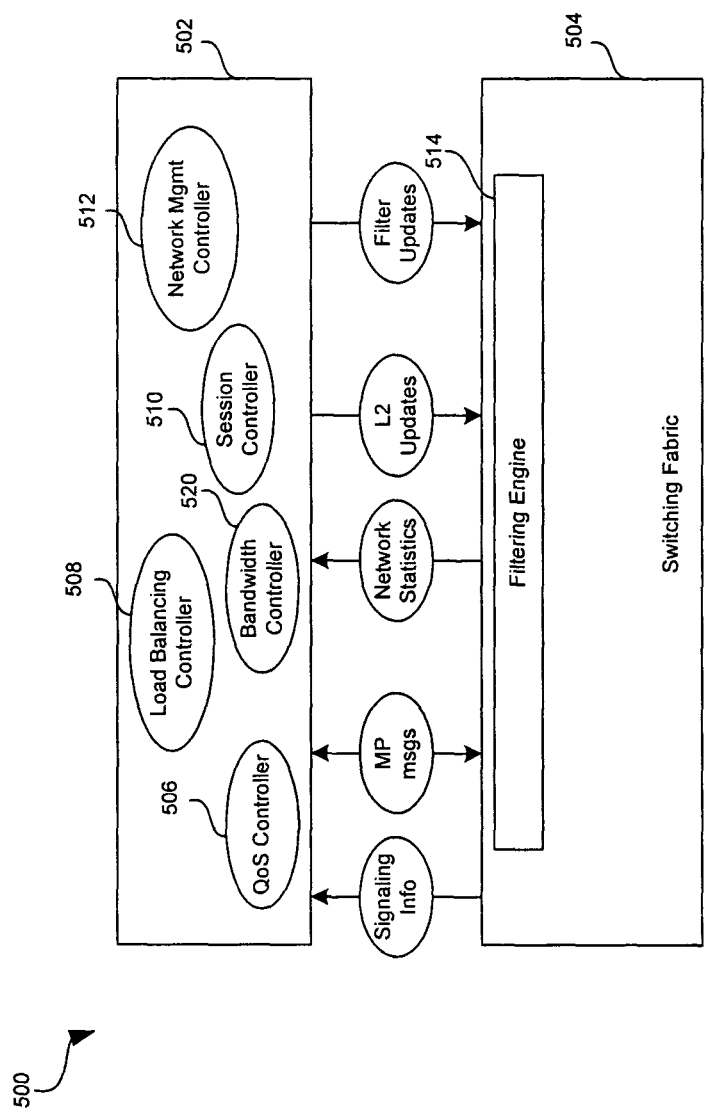
FIG. 5 is a block diagram of an exemplary switching system for bandwidth management in a wireless local area network in accordance with an embodiment of the invention.

FIG. 5 is a block diagram 500 of an exemplary switching system for bandwidth management in a wireless local area network in accordance with an embodiment of the invention. Referring to FIG. 5, there is shown a CPU block 502 and a switching fabric block 804. The CPU block 502 may include a bandwidth management controller block 520, a quality of service (QoS) controller block 506, a load balancing controller block 508, a session controller block 510 and a network management control block 512. The switching fabric block 504 may include a filtering engine block 514. The CPU block 502 may be adapted to interface with the switching fabric block 504. One or more of the QoS controller block 506, load balancing controller block 508, session controller block 510 and network management control block 512 may interface directly with the filtering engine block 514.

In operation, selected signaling packets may be communicated from the switching fabric block 504 to one or more of the bandwidth management controller block 520, QoS controller block 506, load balancing controller block 508, session controller block 510 and network management control block 512. Messaging protocol messages may be used to facilitate communication between the switching fabric block 504 and one or more of the bandwidth management controller block 520, QoS controller block 506, load balancing controller block 508, session controller block 510 and network management control block 512. The selected signaling packets may include, but are not limited to, VoIP packets, and streaming media packets including voice, video and data. The filtering engine block 514 may be adapted to filter information received from one or more of the bandwidth management controller block 520, QoS controller block 506, load balancing controller block 508, session controller block 510 and a network management control block 512. In this regard, the filtering engine block 514 may be adapted to filter messaging protocol messages used to control switching functions, network traffic statistics messages, layer two (2) address update messages, and filter update messages. The filter update messages may include, but are not limited to, bandwidth management messages, access control messages, QoS messages and load balancing messages.

In accordance with an embodiment of the invention, the switching system for network management may include a session control process that may be adapted to manage and control at least one client database and session information for some or all active clients. In an embodiment of the invention, the switching system for network management may be adapted to provide session management information that may be utilized for bandwidth management. The session control process may be configured to enforce access control based on, for example, a client session, a subnet, a network management application, and switch ports. Access control may be used to facilitate, for example, bandwidth management and load balancing in at least a portion of the network. The session control process may also control and manage switching intelligence and to determine bandwidth availability in order to facilitate roaming.

Figure 6:
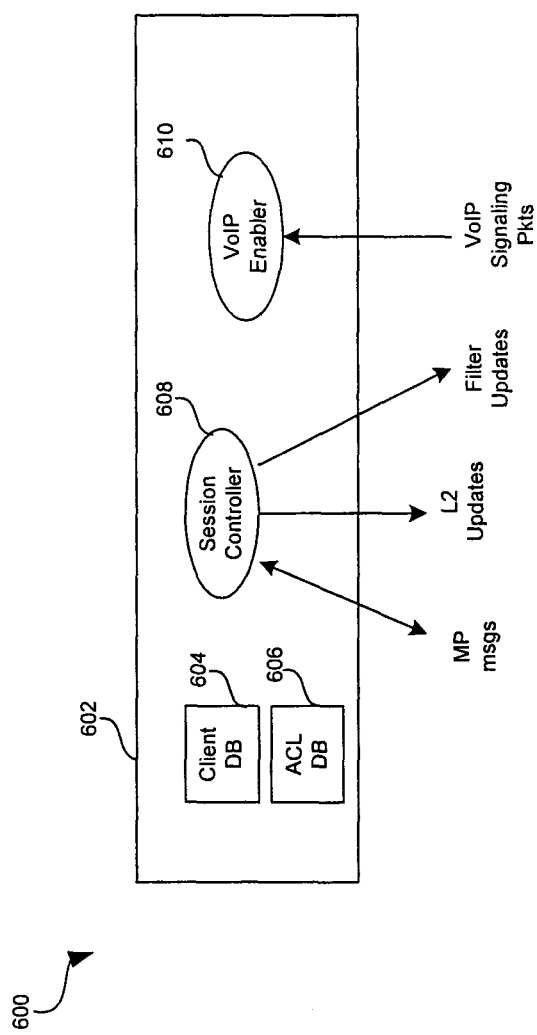
FIG. 6 is a block diagram of an exemplary session control process as described in FIG. 8 that may be utilized by the switching system for bandwidth management in accordance with an embodiment of the invention.

FIG. 6 is a block diagram 600 of an exemplary session control process as described in FIG. 5 that may be utilized by the switching system for bandwidth management in accordance with an embodiment of the invention. Referring to FIG. 6, there is shown a session control process 602 having a client database 604, an access control list (ACL) database 606, a session control manager 608 and a VoIP enabler 610. One or more interfaces may be adapted to provide communication between session manager 608 and the client database 604 and the ACL database 606. The session manager 608 may include at least one interface that may be adapted to facilitate communication with the VoIP enabler 610.

In operation, the session control manager 608 may be adapted to process, for example, messaging protocol messages, layer two (2) updates, and filter updates. The session control manager 608 may be adapted to receive information from one or more of client database 604 and ACL database 606. The VoIP enabler 610 may be adapted to process VoIP signaling packets. VoIP enabler 610 may also be adapted to decode various standards-based VoIP signaling packets and prioritize filter setup. Information from the session control manager 608 may be communicated to the bandwidth management controller 520, the QoS controller 506, the load balancing controller 508, and the network management controller 512, which are illustrated in FIG. 5.

In an embodiment of the invention, the switching system 602 may include a load balancing process that may be adapted to obtain access point load from, for example, a bandwidth management process and a network management process. The network management process may include but is not limited to SNMP, RMON, RMON2, and MIB. The load balancing process may be adapted to keep an access point database on, for example, a plurality or bank of access points. The load balancing process may include intelligence for making load distribution decisions. The access point database may be accessible by one or more of the bandwidth management controller 520, the QoS controller 506, the load balancing controller 508, and the network management controller 512, which are illustrated in FIG. 5. In addition, the bandwidth management controller 520 may be adapted to request information from the session control manager 608 and/or the load balancing process in order to facilitate bandwidth management.

Figure 7:
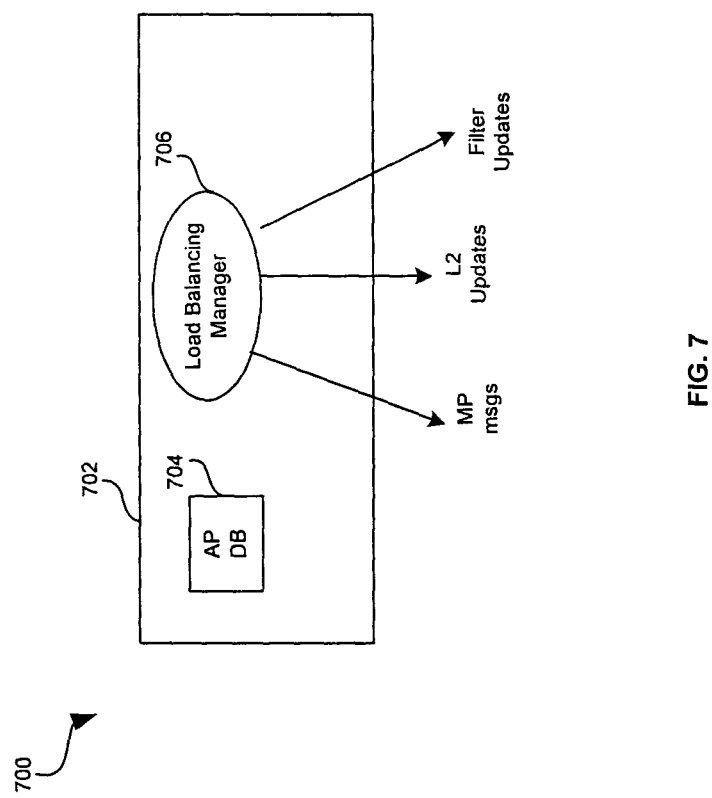
FIG. 7 is a block diagram of an exemplary load balancing process as described in FIG. 8 that may be utilized by the switching system for bandwidth management in accordance with an embodiment of the invention.

FIG. 7 is a block diagram 700 of an exemplary load balancing process as described in FIG. 6 that may be utilized by the switching system for network management in accordance with an embodiment of the invention. Referring to FIG. 7, there is shown a load balancing process 702 having an access point database 702 and a load balancing manager 706. At least one interface may be adapted to provide communication between access point database 704 and the load balancing manager 706. The load balancing manager 706 may be adapted to include at least one interface that may facilitate communication with a network management process.

In operation, the load balancing manager 706 may be adapted to process messaging protocol messages, layer two (2) updates, and filter updates. The load balancing manager 706 may receive network statistics from one or more network management processes. Information from the access point database 704 may be utilized by the load balancing manager 706 for making load balancing decisions.

In an embodiment of the invention, the switching system for network management may include a QoS enabling process that may be adapted to control and manage activities such as, traffic policing, metering filters, and protocol configurations. In this regard, the QoS enabling process may be adapted to manage, for example, 802.11e based configurations that may be sent to the access point. A VoIP enabler may be adapted to decode various standard-based VoIP signaling packets and prioritize filter setup.

Figure 8:
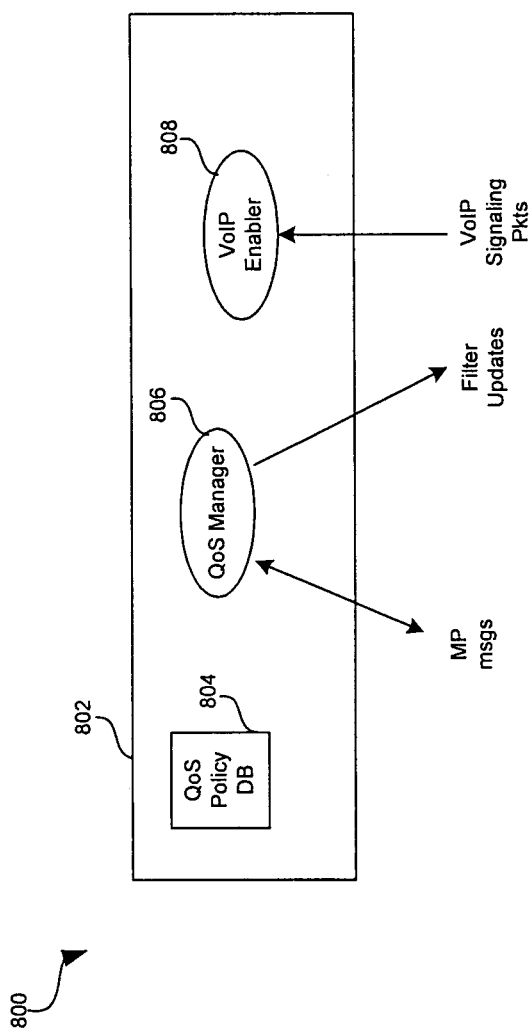
FIG. 8 is a block diagram of an exemplary QoS enabling process as described in FIG. 8 that may be utilized by the switching system for bandwidth management in accordance with an embodiment of the invention.

FIG. 8 is a block diagram 800 of an exemplary QoS enabling process as described in FIG. 8 that may be utilized by an the switching system for network management in accordance with an embodiment of the invention. Referring to FIG. 8, there is shown QoS enabling process 802 having QoS policy database 804, a QoS manager 806 and a VoIP enabler 808. At least one interface may be adapted to provide communication between QoS policy database 804 and the QoS manager 808. The QoS manager 806 may be adapted to include at least one interface that may facilitate communication with, for example, the VoIP enabler 808.

In operation, the QoS manager 806 may be adapted to process, for example, messaging protocol messages, and filter updates. The QoS manager 806 may send and receive VoIP signaling information to and from VoIP enabler 808 806 for making QoS related decisions. In certain instances, information related to the QoS management may be utilized for bandwidth management. Accordingly, with reference to FIG. 4, the bandwidth management controller 412 may be adapted to receive pertinent QoS related information from the QoS controller 414.

In one aspect of the invention, the QoS controller 414, the load balancing controller 416, the session controller 418, the network management controller 420 and/or the bandwidth management controller 412 may be adapted to transfer and/or store information in a database, for example, database 424. In this regard, the QoS controller may be adapted to store at least some of its related QoS related information in database 424. Accordingly, whenever a need arises, the bandwidth management controller may access database 424 and retrieve any QoS related information that may be pertinent to bandwidth management.

In another aspect of the invention, in certain instances, the bandwidth management controller 422 may be adapted to request required QoS related information from the QoS controller 414. To facilitate bandwidth management, real-time information not necessarily located in the database 424 may be requested from the QoS controller 414 whenever a need arises. Additionally, through this mechanism, the QoS controller 414 may be adapted to also request an receive related information from any one or more of the load balancing controller 416, the session controller 418, the network management controller 420, the bandwidth management controller 422 and/or the database 424. The bandwidth management process may be executed in an adaptive manner and may occur in real-time.

In accordance with another embodiment of the invention, dependent on the modulation scheme utilized, one or more of the PLCP frames illustrated in FIG. 1b, FIG. 1c, FIG. 1d and FIG. 1e may be adapted to contain information which may be utilized for providing communication in accordance with various embodiments of the invention. Additionally, the PLCP frames may be adapted to convey information for any one or more of the 801.11a, 802.11b and 802.11g modes of operation utilized by access points and/or access devices in accordance the embodiments of the invention.

Accordingly, the present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

Notwithstanding, the invention and its inventive arrangements disclosed herein may be embodied in other forms without departing from the spirit or essential attributes thereof. Accordingly, reference should be made to the following claims, rather than to the foregoing specification, as indicating the scope of the invention. In this regard, the description above is intended by way of example only and is not intended to limit the present invention in any way, except as set forth in the following claims.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

The invention claimed is:

1. A method for providing bandwidth management in a hybrid wired/wireless local area network, the method comprising:
   receiving, by a network switch, at least a first messaging protocol message for establishing a communication session within the hybrid wired/wireless local area network, wherein said first messaging protocol message is initiated by at least one of a first access point which is a wireless portion of the hybrid wired/wireless local area network or a first switch which is a wired portion of the hybrid wired/wireless local area network on behalf of a client access device;
   responsive to said first messaging protocol message, determining, by the network switch, an available communication bandwidth for at least a portion of the hybrid wired/wireless local area network by initiating a query to one or more access points of the hybrid wired/wireless local area network;
   allocating, by the network switch, a portion of the communication bandwidth to accommodate said communication session based on one or more query responses from said one or more access points; and
   notifying, by the network switch, said first access point of said allocated bandwidth using at least a second messaging protocol message, wherein said first access point is denied access to the hybrid wired/wireless local area network due to a determination of insufficient bandwidth capacity for the hybrid wired/wireless network, wherein said first access point is subsequently notified, by the network switch, to reattempt establishment of said communication session when sufficient channel capacity is determined to be currently available.

2. The method according to claim 1, comprising requesting bandwidth usage information from at least one of said first access point or said first switch using said at least a first messaging protocol message.

3. The method according to claim 2, comprising deallocating said allocated bandwidth using at least a third messaging protocol message subsequent to termination of said established communication session.

4. The method according to claim 3, comprising sending said at least a third messaging protocol message from said network switch to at least one of said first switch or said first access point.

5. The method according to claim 4, comprising receiving bandwidth information from at least one of a quality of service management controller, a load balancing management controller, a session control controller, or a network management controller using at least a fourth messaging protocol message.

6. The method according to claim 5, comprising requesting said bandwidth information from said at least one of said quality of service management controller, said load balancing management controller, said session control controller, or said network management controller using a fifth messaging protocol message.

7. The method according to claim 6, wherein said first, second, third, fourth and fifth messaging protocol messages each comprise at least one message selected from a group consisting of an access point status message, access point configuration message, a switch status message, a switch configuration message, a client status message and a device discovery message.

8. A non-transitory machine-readable storage, having stored thereon a computer program having at least one code section for providing bandwidth management in a hybrid wired/wireless local area network, the at least one code section executable by a machine for causing the machine to perform the steps comprising:

receiving, by a network switch, at least a first messaging protocol message for establishing a communication session within the hybrid wired/wireless local area network, wherein said first messaging protocol message is initiated by at least one of a first access point which is a wireless portion of the hybrid wired/wireless local area network or said first switch which is a wired portion of the hybrid wired/wireless local area network on behalf of a client access device;

responsive to said first messaging protocol message, determining, by the network switch, an available communication bandwidth for at least a portion of the hybrid wired/wireless local area network by initiating a query to one or more access points of the hybrid wired/wireless local area network;

allocating, by the network switch, a portion of the communication bandwidth to accommodate said communication session based on one or more query responses from said one or more access points; and notifying, by the network switch, said first access point of said allocated bandwidth using at least a second messaging protocol message, wherein said first access point is denied access to the hybrid wired/wireless local area network due to a determination of insufficient bandwidth capacity for the hybrid wired/wireless network, wherein said first access point is subsequently notified, by the network switch, to reattempt establishment of said communication session when sufficient channel capacity is determined to be currently available.

9. The machine-readable storage according to claim 8, comprising code for requesting bandwidth usage information from at least one of said first access point or said first switch using said at least a first messaging protocol message.

10. The machine-readable storage according to claim 9, comprising code for de-allocating said allocated bandwidth using at least a third messaging protocol message subsequent to termination of said established communication session.

11. The machine-readable storage according to claim 10, comprising code for sending said at least a third messaging protocol message from said network switch to at least one of said first switch or said first access point.

12. The machine-readable storage according to claim 11, comprising code for receiving bandwidth information from at least one of a quality of service management controller, a load balancing management controller, a session control controller, or a network management controller using at least a fourth messaging protocol message.

13. The machine-readable storage according to claim 12, comprising code for requesting said bandwidth information from said at least one of said quality of service management controller, said load balancing management controller, said session control controller, or said network management controller using at least a fifth messaging protocol message.

14. The machine-readable storage according to claim 13, wherein said first, second, third, fourth and fifth messaging protocol messages each comprise at least one message selected from a group consisting of an access point status message, access point configuration message, a switch status message, a switch configuration message, a client status message and a device discovery message.

15. A system for providing bandwidth management in a hybrid wired/wireless local area network, the system having a network switch comprising:

a network switch receiver adapted to receive, at least a first messaging protocol message for establishing a communication session within the hybrid wired/wireless local area network, wherein said first messaging protocol message is initiated by at least one of a first access point which is a wireless portion of the hybrid wired/wireless local area network or a first switch which is a wired portion of the hybrid wired/wireless local area network on behalf of a client access device on behalf of a client access device;

at least one network switch controller adapted to determine an available communication bandwidth for at least a portion of the hybrid wired/wireless local area network, responsive to said first messaging protocol message by initiating a query to one or more access points of the hybrid wired/wireless local area network;

said at least one network switch controller adapted to allocate a portion of the communication bandwidth to accommodate said communication session based on one or more query responses from said one or more access points; and said at least one network switch controller adapted to notify said first access point of said allocated bandwidth using at least a second messaging protocol message, wherein said first access point is denied access to the hybrid wired/wireless local area network due to a determination of insufficient bandwidth capacity for the hybrid wired/wireless network, wherein said first access point is subsequently notified to reattempt establishment of said communication session when sufficient channel capacity is determined to be currently available.

16. The system according to claim 15, wherein said at least one network switch controller is adapted to request bandwidth usage information from at least one of said first access point or said first switch using said at least a first messaging protocol message.

17. The system according to claim 16, wherein said at least one network switch controller is adapted to de-allocate said allocated bandwidth using at least a third messaging protocol message subsequent to termination of said established communication session.

18. The system according to claim 17, wherein said at least one network switch controller is adapted to send said at least a third messaging protocol message from said network switch to at least one of said first switch or said first access point.

19. The system according to claim 18, wherein said network switch receiver is adapted to receive bandwidth information from at least one of a quality of service management controller, a load balancing management controller, a session control controller, or a network management controller using at least a fourth messaging protocol message.

20. The system according to claim 19, wherein said at least one network switch controller is adapted to request said bandwidth information from said at least one of said quality of service management controller, said load balancing management controller, said session control controller, or said network management controller using at least a fifth messaging protocol message.

21. The system according to claim 20, wherein said first, second, third, fourth and fifth messaging protocol messages each comprise at least one message selected from a group consisting of an access point status message, access point configuration message, a switch status message, a switch configuration message, a client status message and a device discovery message.

22. The system according to claim 20, wherein said at least one network switch controller includes a bandwidth management controller, a quality of service controller, a load balancing controller, a session controller and a network management controller.

* * * * *

UNITED STATES PATENT AND TRADEMARK OFFICE
CERTIFICATE OF CORRECTION

PATENT NO. : 8,619,728 B2  Page 1 of 1
APPLICATION NO. : 10/658725
DATED : December 31, 2013
INVENTOR(S) : Frank et al.

It is certified that error appears in the above-identified patent and that said Letters Patent is hereby corrected as shown below:

In the Claims

Column 19, line 13, Claim 8, after the word "or" delete the word "said" and insert the word --a--.

Signed and Sealed this
Eighth Day of April, 2014

Michelle K. Lee
*Deputy Director of the United States Patent and Trademark Office*